United States Patent [19]

Kahn et al.

[11] Patent Number: 4,552,773
[45] Date of Patent: * Nov. 12, 1985

[54] FREEZER STABLE WHIPPED ICE CREAM AND MILK SHAKE FOOD PRODUCTS

[75] Inventors: Marvin L. Kahn, Williamsville; Robert J. Lynch, Buffalo, both of N.Y.

[73] Assignee: Rich Products Corporation, Buffalo, N.Y.

[*] Notice: The portion of the term of this patent subsequent to Dec. 27, 2000 has been disclaimed.

[21] Appl. No.: 529,766

[22] Filed: Sep. 6, 1983

Related U.S. Application Data

[63] Continuation-in-part of Ser. No. 439,129, Nov. 2, 1982, Pat. No. 4,421,778.

[51] Int. Cl.$^4$ .............................................. A23G 9/02
[52] U.S. Cl. .................................... 426/564; 426/565; 426/569
[58] Field of Search ............... 426/564, 565, 566, 567, 426/580, 583, 584, 585, 569, 613

[56] References Cited

U.S. PATENT DOCUMENTS

| | | | |
|---|---|---|---|
| 3,914,440 | 10/1975 | Witzig | 426/565 |
| 3,949,102 | 4/1976 | Hellyer | 426/565 |
| 4,031,261 | 6/1977 | Durst | 426/565 |
| 4,146,652 | 3/1979 | Kahn et al. | 426/565 |
| 4,421,778 | 12/1983 | Kahn et al. | 426/564 |

Primary Examiner—Jeanette Hunter

[57] ABSTRACT

Whipped food products are disclosed comprised of an oil-in-water emulsion of nonfat milk solids, and about 40% to about 70% water, and sugar in a ratio to water of about 1:1.75 to about 3.0, said sugar being comprised of at least about 30% fructose and/or dextrose; and about 3% to about 10% fat, wherein at least about 50% of said fat is a solid beta phase-tending crystalline fat, and minor, effective amounts of flavoring, emulsifier, and stabilizer, wherein the stabilizer comprises a polysaccharide stabilizer effective to substantially inhibit the crystallization of the lactose present in the nonfat milk solids, wherein the product is substantially noncrystalline and spoonable at about 0° F., and the volume of the product remains substantially constant during storage at about 0° F. for at least about six months. Optionally, a polyhydric alcohol may replace a part of the sugar.

58 Claims, No Drawings

FREEZER STABLE WHIPPED ICE CREAM AND MILK SHAKE FOOD PRODUCTS

CROSS REFERENCE TO RELATED APPLICATIONS

This application is a continuation-in-part of U.S. Pat. application Ser. No. 439,129, filed 11/2/82 now U.S. Pat. No. 4,421,778.

BACKGROUND OF THE INVENTION

Milk shakes are comprised of aqueous emulsions which are foamed by being whipped with air. When a conventional milk shake product is stored in a container at refrigerator temperatures, the foam rapidly collapses, and the result is a substantial loss in the volume of the product during storage. Thus, conventional milk shakes such as those sold by fast-food restaurants must be consumed shortly after they are prepared and cannot be stored at refrigerator temperatures for longer than about one hour. At freezer temperatures such shake products freeze solid and require a lengthy thawing period before they can be consumed with either a spoon or a straw, i.e., become spoonable or flowable.

Frozen foods such as frozen vegetables, etc., are stored in supermarket freezers at about 0° F. However, ice creams are conventionally stored in supermarket freezers at temperatures of about −20° F., since at freezer temperatures at about 0° F., a substantial loss of product volume is typically observed after less than about a one-month storage period. Moreover, when stored at about 0° F., conventional ice cream products tend to become crystalline and grainy. From an energy consumption standpoint, the requirement of −20° F. storage temperatures for ice cream products is economically disadvantageous.

It is an object of this invention to provide whipped ice cream and milk shake products which maintain a stable volume when stored for prolonged periods at refrigerator temperatures, as well as at the economically-advantageous freezer storage temperature of about 0° F. It is also an object of this invention to provide whipped products which remain in a substantially noncrystalline and spoonable state at freezer temperatures of about 0° F. and which become flowable soon after exposure to ambient temperatures and, therefore, do not require a prolonged thawing period prior to consumption.

Other objects and advantages of this invention will be apparent from the description of this invention which follows.

BRIEF DESCRIPTION OF THE INVENTION

The whipped products of this invention can be stored at freezer temperatures of about 0° F. for at least about 6 months, and preferably for at least about one year, substantially free from losses in the volume of the product. At freezer temperatures of about 0° F., the whipped milk shake and ice cream products of this invention are in a lightly firm, substantially noncrystalline, and spoonable condition. At about 0° F. the whipped product resembles fancy quality fresh-made ice cream. When served at about 0° F. to about 15° F., the product is soft, easily spoonable and resembles creamy soft-serve ice cream.

At about 15° F. to about 32° F., the consistency of the product resembles a conventional thick shake product, such as those sold by fast-food restaurants. The whipped milk shake and ice cream products of this invention may be stored substantially free from loss of product volume at refrigerator temperatures of about 32° F. to about 42° F. for at least about 5 days, and preferably for at least about 10 days. The product is in a strawable state at refrigerator temperatures and, therefore, can be removed from the refrigerator and immediately consumed through a straw. When removed from freezer storage at about 0° F. and warmed to ambient temperature, preferred embodiments of the present shake-type products become flowable rapidly, i.e., within about 5–10 minutes.

This invention provides a whipped or whippable food product comprised of an oil-in-water emulsion of nonfat milk solids, and about 40% to about 70% water, and sugar in a ratio to water of about 1:1.75 to about 3.0, the sugar being comprised of at least about 30% fructose and/or dextrose; and about 3% to about 10% fat, wherein at least about 50% of the fat is comprised of a solid beta phase-tending crystalline fat, and minor, effective amounts of flavoring, emulsifier, and stabilizers comprising a polysaccharide stabilizer in an amount effective to inhibit crystallization of the milk solids' lactose at freezer temperatures of about 0° F. The product is substantially noncrystalline and spoonable at about 0° F. When whipped, the volume of the product remains substantially constant during storage at about 0° F. for at least about six months, and preferably for at least about one year.

In a preferred embodiment of the whipped or whippable food products of the present invention, a part of the sugar component is replaced by an edible polyhydric alcohol, i.e., from about 0.25–10%, preferably about 0.5–6% of the formulation may be a polyhydric alcohol or alcohol mixture. The polyhydric alcohol component acts to reduce the perceived sweetness of the products and to decrease the time required for the products to become flowable upon being exposed to ambient temperatures.

A premix for use in preparing whipped food products is also provided by this invention which comprises: about 1.5% to about 20% off an emulsifier, about 5% to about 35% of a stabilizer comprised of a polysaccharide stabilizer effective to substantially inhibit lactose crystallization at about 0° F., about 10% to about 35% of a solid beta phase-tending crystalline fat, and a dairy-derived protein carrier for the foregoing ingredients.

The present invention also provides novel methods for preparing whipped food products including milk shakes and ice cream having the desirable freezer and refrigerator storage properties mentioned above.

DETAILED DESCRIPTION OF THE INVENTION

The whipped products of this invention may be prepared from a premix comprised of an emulsifier, stabilizer and a beta phase-tending crystalline fat. The premix may be comprised of about 10% to about 35%, preferably about 15% to about 30%, of a beta phase-tending crystalline fat, about 1.5% to about 20% emulsifier, preferably about 2% to about 15% emulsifier, and about 5% to about 35%, and preferably about 7% to about 30% of stabilizer. The premix will also comprise a dairy-derived carrier for the components of the premix.

Throughout this application all amounts are by weight unless expressly stated otherwise. In addition, percentages are on a total formulation basis unless another basis is specified.

Any beta phase-tending crystalline fat which is a solid at room temperture may be employed as the fat component of the premix, and preferably those saturated or partially hydrogenated beta phase-tending crystalline fats having a melting point of about 85° F. to about 120° F., and preferably 90° F. to 105° F. Suitable beta phase-tending crystalline fats include the lauric fats, coconut oil, palm kernel oil, babassu oil, palm oil, butter fat, and the like.

Since the whipped products of this invention are oil-in-water emulsions, an emulsifier is a necessary component of the premix, as well as the final whipped product. Emulsifiers promote the formation of a stable dispersion of fat in the aqueous phase of the product, and also enhance the rate of aeration, and total aeration obtained. Any one of a number of emulsifiers may be employed including: hydroxylated lecithin, mono, di, or polyglycerides of fatty acids, such as monostearin and monopalmitin; polyoxyethylene ethers of fatty esters of polyhydric alcohols, such as the polyoxyethylene ethers of sorbitan monostearate (polysorbate 60 or 80) or the polyoxyethylene ethers of sorbitan distearate; fatty esters of polyhydric alcohols such as sorbitan monostearate; mono- and di-esters of glycols such as propylene glycol monostearate, and propylene glycol monopalmitate, succinoylated monoglycerides; sodium or calcium stearoyl-2-lactylate; and the esters of carboxylic acids such as lactic, citric, and tartaric acids with the mono- and diglycerides of fatty acids such as glycerol lactopalmitate and glycerol lactostearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. For example, it may be desirable to provide a controlled hydrophile-lipophile balance (HLB) as with a lipophilic emulsifier such as glyceryl monostearate or sorbitan monostearate with a hydrophilic material, such as polysorbate 80, while in other formulations, it has been found desirable to simply employ a purified mixture of mono- and diglycerides, i.e., a mixture of glyceryl monostearate and glyceryl distearate.

Any of a number of solid protein or carbohydrate additives, referred to herein as "carriers", may be included in the premix in the amount of about 20% to about 80%, preferably about 35% to about 65%. Preferred carriers include dairy-based carriers such as dairy whey, whey protein concentrate, nonfat milk solids, powdered milk and mixtures thereof. Flavorants such as cocoa, sugars such as dextrose, granulated sugars, or corn syrup solids (preferably of about 10 to about 30 D.E., i.e., 10-20 D.E.), may also be used. These additives function as carriers for the beta phase-tending crystalline fat and the other components of the premix, and also aid in preventing the premix from absorbing water and solidifying during storage. When dairy whey is employed as the carrier, it is preferred to employ about 35% to about 60% of this ingredient in the premix.

The dairy-derived carriers also function in the present products as the major source of the protein content. Preferably, the dairy-derived carriers will be present in the final products at a concentration of about 5-25%, preferably about 10-20%. For example, a typical product may contain about 5-8% nonfat milk solids and from about 3-6% of a whey protein concentrate. The total protein solids concentration of the final product will then be about 3-10% or higher. A disadvantage of milk-derived carriers is that they contribute an amount of lactose to the finished products, i.e., about 3-10% in typical formulations, which tends to locally-concentrated and crystallize when the products are cooled to freezer temperatures of about 0°-10° F. and cause the emulsion to break, leading to collapse of the foam, subsequent loss of product volume and separation.

Dairy carriers such as whey protein concentrates and nonfat milk solids generally contain about 40-50% lactose while unconcentrated whey may contain higher amounts of lactose, i.e., up to about 75% in some cases. As used herein after, the term "whey" is intended to include all the forms of whey or whey mixtures commonly employed in food processing, including dairy whey and whey protein concentrates.

A careful selection of a stabilizer or stabilizer mixture is necessary to counteract the undesirable properties of the lactose introduced into the present formulations and to achieve the necessary product stability.

The stabilizer components useful in the practice of the present invention will comprise a polysaccharide stabilizer, preferably sodium carboxymethylcellulose (CMC) in the amount of about 0.5-7%, and preferably about 1.0-6.0% of the premix. It is highly preferred that the CMC be used in combination with an amount of carrageenan equal to about 0.125-2%, preferably 0.25-1.0% of the premix.

As used herein, the term "carrageenan" refers to the composition which is a variable mixture of potassium, sodium, calcium, magnesium and ammonium sulfate esters of galactose and 3,6-anhydrogalactose copolymers, or to any of the gelling fractions which may be isolated as their purified salts, i.e., calcium carrageenan.

It has further been found advantageous to include about 1-25%, preferably about 1.5-20% of the microcrystalline cellulose in the premix as a component of the stabilizer mixture, along with the carrageenan and CMC, although, if desired, the microcrystalline cellulose and a part of the CMC may be replaced by other appropriate polysaccharide stabilizers, such as those derived from starch. For example, an about 1:1 mixture of dextrin and pregelatinized starch, i.e., about 5-20% of each in the premix or about 0.5-5% of each in the final products may be used. Another preferred polysaccharide stabilizer is maltodextrin. Preferably, about 0.5-6% of 15 D.E. maltodextrin may be used in the final products. Other polysaccharide stabilizers which may be employed in this fashion include the plant gums such as xanthan gum, guar gum, locust bean gum, gum tragacanth and gum arabic, as well as the seaweed extract sodium alginate.

It is believed that the polysaccharide stabilizers function to enhance the refrigerator, and especially the freezer stability of the whipped products prepared from the premixes by preventing or inhibiting the crystallization of the lactose present in the dairy components which are used. The CMC is believed to be particularly important in stabilizing the emulsion against separation under freezer and refrigerator conditions. The polysaccharide stabilizers also may be employed to aid in the adjustment of the mouth-feel and viscosity of the final products.

The polysaccharide stabilizers will comprise about 0.125-10%, preferably about 0.25-5% by weight of the final products.

The premix may be prepared by first dry blending the solid emulsifier, stabilizer and carriers, in the desired ratios. The blending of the solid ingredients of the mix is preferably performed in a ribbon blender or another blender suitable for blending powders. The fat is heated until it is completely liquid, and is poured slowly or sprayed into the blender so that the powder components of the premix are encapsulated by the fat. The resultant premix product has a cornmeal-like texture.

The premix is suitable for use in the preparation of ice cream and shake products, of both the part-dairy and all-dairy types. For example, the premix may be mixed with water, flavoring, vegetable oil, sugar, and nonfat milk solids, to provide a part-dairy or mellorine shake or ice cream product; or the premix may be blended with water, flavoring, butter fat, sugar and nonfat milk solids, to provide an all-dairy shake or ice cream product. About 2.5% to about 4.0%, preferably about 3.0%, by weight of the premix may also by employed to prepare a shake or ice cream product which is in the form of an oil-in-water emulsion comprised of about 40% to about 70% water, preferably about 50% to about 65% water; sugar in a ratio to water of about 1 to about 1.75–3.0, preferably about 1 part sugar to about 2.5 parts water, about 3% to about 10% fat, preferably about 4% to about 7% fat, about 0.025% to about 0.28% CMC stabilizer, preferably about 0.05–0.2% CMC, about 0.01–1% carrageenan and effective amounts of an emulsifier, flavoring and nonfat milk solids, and, optionally, whey.

Optionally, the products will also include, as a part of the stabilizer component, about 0.125–1.0%, preferably about 0.35–0.5% of microcrystalline cellulose and/or an about 1:1 mixture of about 0.5–5% each of dextrin and pregelatinized starch. At least about 50% of the fat should be comprised of beta phase-tending crystalline fat of the type described above, while the balance of the fat may be comprised of any of a number of polyunsaturated fats.

A dairy ice cream or shake product is prepared by employing butter fat in the fat component of the formulation. A part-dairy or mellorine product is provided by excluding butter fat from the formulation and employing vegetable oils as the fat component, in combination with the nonfat milk solids component. In the all-dairy ice creams and shakes, the beta fat component may be comprised entirely of butter fat.

The sugar component of the formulation is comprised of at least about 30% fructose and/or dextrose, and preferably about 35% to about 60% fructose and/or dextrose. The sugar component of the product may be comprised of a blend of about a 27 to 75 D.E. corn syrup, a fructose-dextrose syrup, and sucrose, in proportions sufficient to provide at least about 30% fructose and/or dextrose in the sugar component. Whipped products may be prepared containing about 10% to about 13% of a high fructose-dextrose syrup, about 1–12% sucrose, preferably about 7% to about 10% sucrose, and about 1.5% to about 4.0% of about a 27 to about 75 D.E. corn syrup.

A fructose-dextrose syrup suitable for use herein is Isosweet 100, comprised of 29% water and 71% sugars (50% dextrose, 42% fructose, 1.5% maltose, and 5% higher saccharides). A useful high fructose-dextrose syrup comprises 23.5% water and the remainder 55% fructose and 45% dextrose. A fructose concentrate suitable for use herein is an aqueous syrup having 80% sugar of which 90% is fructose and 10% is dextrose.

A corn syrup useful in the practice of the present invention may have a water content of about 20.1% and a D.E. of about 36, and may be comprised of about 79.9% sugar solids: 14.1% dextrose, 11.7% maltose, 10.2% trisaccharides and about 64.0% higher saccharides, available as Cornsweet®36/43 from ADM Foods, Cedar Rapids, Iowa.

The corn syrup employed may have a water content of about 22.5%, and a D.E. of about 29, and may be comprised of about 77.5% sugar solids: 8.4% dextrose, 14.6% maltose, 8.6% trisaccharides, and 68.4% tetrasaccharides and higher, sold under the trade name Amaizo Lodex C Corn Syrup by American Maize Products Co., New York, N.Y. Corn syrups or corn syrup solids having lower D.E. values, i.e., 15 and 24, may also be employed in the present compositions.

Any of a number of sugars may be employed in combination with the fructose or dextrose component of the formulation. Useful sugars include the mono-saccharides, di-saccharides and their degradation products: e.g., pentoses, including aldopentoses, methylpentoses, ketopentoses, like xylose and arabinose, a deoxyaldose like rhamnose, hexoses and reducing saccharides such as aldo hexoses like galactose and mannose; and ketohexoses, for example, sorbose; di-saccharides, like lactose and maltose; and non-reducing di-saccharides such as sucrose. Typically, the commercially-available mixtures of invert sugars are used which contain dextrose and levulose, as well as maltose and corn syrup solids. As defined herein, the term "sugars" is not intended to include the polysaccharides which are selected and incorporated into the present compositions for their stabilizing powers.

Polyhydric alcohols which are desirably used in the present formulations to replace a part of the sugar content include diols and polyols such as propylene glycol, sorbitol and glycerol. The higher diols, such as the aliphatic 1,3-diols containing four to fifteen carbon atoms in the aliphatic chain and their esters which are completely metabolized can also be used. These materials are stable, non-volatile oils with good storage and shelf life and appreciable water solubility, and can be readily emulsified and formulated into whipped and whippable compositions. Of the polyhydric alcohols useful in the present formulations glycerol is preferred.

Preferably, the amount of polyhydric alcohol plus fructose and/or dextrose will comprise at least about 40% of the total sugar solids employed, most preferably the fructose-dextrose-polyhydric alcohol mixture will comprise 45–85% of the total sugar content. Therefore, the polyhydric alcohol component will comprise about 1–35% by weight of the total of the polyhydric alcohol and the sugar solids, preferably about 2–30%. Since the polyhydric alcohol effectively replaces a part of the sugar content of the present products, the sugar:water ratio of such products will fall within the range of about 1:2–4, preferably about 1:3–4. The ratio of total sugar solids plug glycerol to water will fall within the range of about 1:1.5–3.0.

Replacement of about 1–35% of the sugar content of the present products with a suitable polyhydric alcohol or alcohol mixture results in a desirable reduction in the sweetness of the products. The products which are meant to be consumed in the flowable or pourable state, such as milk shakes, also become flowable more rapidly upon being removed from freezer temperatures of about 0° F. When sugars comprise the slow flow-promoting or plasticizing agents used in the present compositions, the products are spoonable at freezer temperatures and become flowable after exposure to ambient temperatures of 60°–80° F. for about 20–30 minutes. However, replacement of about 1–35% of the sugar content, preferably about 2–30%, with a suitable polyhydric alcohol such as glycerol, permits the products to become pourable after about 5–10 minutes at ambient temperatures. The polyhydric alcohols also impart to the shakes a resistance to bacterial or mycological spoilage, so that adjuvant preservatives are not required.

When polyhydric alcohols are employed in the present compositions, it is also preferred to employ an amount of lower D.E. corn syrup solids such as 15 or 24 D.E. corn syrup solids, as a portion of the total sugar solids. The amount of corn syrup solids used will preferably be about equal to the amount of polyhydric alcohol used, i.e., about 0.5–6% glycerol and about 0.5–6% 15 D.E. corn syrup solids or 24 D.E. corn syrup solids.

Fats high in unsaturation suitable for use in the formulation are safflower oil, corn oil, soybean oil, cottonseed oil and sunflower oil. Unsaturated fats as used in this specification are those having an iodine value of about at least 50 which include partially hydrogenated fats, and the more highly unsaturated fats with an iodine value of about 100. It is believed that the use of an unsaturated fat, in the amount of about 50% by weight of the fat content, helps keep the product spoonable at freezer temperatures, and enhances the mouth-feel of the formulation.

Other ingredients known to those skilled in the art may also be employed to impart their characteristic effects to the compositions of the present invention. Typical of such ingredients are flavoring agents, colorants, vitamins, minerals and the like. Suitable flavoring agents can be employed to impart vanilla, strawberry, cream, chocolate, coffee, maple, spice, mint, butter, caramel, fruit, cocoa and other flavors. Furthermore, other additives such as phosphates and the like may be employed for their known functions. Several types of ingredients used are described below.

Protein concentrates and isolates may also be used to improve the nutritional qualities of the product and to facilitate and maintain a whipped structure. Protein also aids in emulsification and contributes to flavor. Bland protein concentrates with a wide range of fiber content, bland soy flour, and food proteins are all useful, generally in concentrations from about 0–10%, preferably from about 0.3–3%. Alternatively, use can be made of a protein such as sodium or calcium caseinate which is conventional in whipped toppings, or as its substitute, a protein hydrolysate in a minor amount.

The whipped product may be prepared from the premix by first blending the sugar component and the polyhydric alcohol component, if any, with water at high shear and at pasteurizing temperatures of about 170° F. The premix, nonfat milk solids, and all other nonfat components of the formulation are then added to the sugar solution, and the resultant mixture is blended at high shear and at pasteurizing temperatures until a solution is formed. At this point the balance of the fat component may be added, and the mixture is blended.

When the product is not prepared from a premix, it is prepared by first blending the sugar component of the formulation with water at high shear, and at pasteurizing temperatures of about 160°–170° F. At this point all nonfat components of the formulation are added to the sugar solution and the resultant mixture is blended at high shear and at pasteurizing temperatures until a solution is formed. The fat component is then added to the solution, and blended with other ingredients.

The blended ingredients are then passed through an homogenizer of the typical dairy type. Although homogenization may be accomplished in one stage, it is carried out in two stages for best results. Preferably, the pressure during the first stage is maintained at a minimum of about 300 psi and a maximum of about 1,000 psi, most preferably about 500 psi, and the pressure during the second stage is maintained at about 2,000 to about 10,000 psi, preferably at about 3,000 psi. The mix is usually maintained at a temperature of from about 140° C. to about 170° C., during homogenization. After homogenization the product is directly cooled by passage through a heat exchanger (i.e., a plate cooler or votator), until a product temperature of about 35° C. to about 47° F. is reached.

Prior to shipping the mix is preferably held at about 40° F. to about 47° F. for about 4 to about 24 hours. The mix is then whipped by passing it through a milk shake or ice cream freezer such as those conventionally employed in the dairy industry. The product exits the freezer in a whipped state at a temperature of about 68° F. to about 75° F. The blend may be whipped to an overrun of about 70% to about 130%. However, for a shake product the overrun is preferably about 60% to about 100%. For a soft-serve ice cream, the overrun is preferably about 90% to about 130%. Overrun refers to the weight of the unwhipped product minus the weight of the whipped product divided by the weight of the unwhipped product times 100, for a constant volume of product.

The following examples are not intended to be limiting but rather illustrative of some approaches taken and, of course, may be varied in accordance with the spirit and scope of the invention.

EXAMPLE 1

A non-dairy chocolate shake formulation is prepared as follows:

| Ingredient | Amount (%) |
| --- | --- |
| 1. Nonfat dry milk | 6.00 |
| 2. Whey concentrate | 5.00 |
| 3. Isosweet 100 | 12.00 |
| 4. Sucrose | 9.00 |
| 5. 36 D.E. corn syrup | 3.00 |
| 6. Seakem C | .02 |
| 7. Avicel CL-611 | .45 |
| 8. CMC-7HOF | .10 |
| 9. Water | 55.96 |
| 10. D-23-A | 1.75 |
| 11. Ice II | .20 |
| 12. Soybean Oil | 3.00 |
| 13. Coconut Oil | 3.00 |
| 14. Premium Overtone Vanilla | .50 |

Seakem C, employed in the formula, and Seakem D-10 employed in Ex. 5B, below, are refined calcium carrageenans, available from Marine Colloids, Inc., Walnut Creek, Calif. They are comprised of 3,6-anhydro-d-galactose and sulfated d-galactose residues linked together to form long chain polymers having molecular weights of several hundred thousand. The ester sulfate group of carrageenan expressed as $SO_4^=$ is approximately 25% by weight of the product.

Avicel CL-611 employed in the formulation is a microcrystalline cellulose containing a small amount of CMC, commercially-available from FMC Corporation, Philadelphia, Pa.

CMH-7HOF is a purified sodium carboxymethylcellulose gum, sold by Hercules Co.

D-23-A in the above formulation is a Dutch cocoa comprised of about 23% cocoa fat, sold by Dezaan Co.

Ice II is an emulsifier comprised of 20% polysorbate 80, and 80% mono- and diglycerides (glycerol monostearate).

The procedure for making the product is as follows:

The Isosweet (3), corn syrup (5) and flavoring (14) were added to water (9) and mixed under high shear conditions at about 160° F. Component (11) was then added and dissolved, followed by the addition of components (1), (2), (6), (7), (8), (10) and a portion of component (4). The foregoing components were mixed under high shear and at pasteurizing temperatures until dissolved, and then the balance of component (4) was added. Next, the fat components (12) and (13) were added to the solution, the mixture was heated to 160° F., and homogenized in two steps, first at 500 psi and then at 3,000 psi. The product was directly cooled in a heat exchanger until the product reached a temperature of about 36° C. to about 48° C. The product was placed in a suitable container and stored for about 18 hours, at temperatures of 41° F. The product was then whipped to an overrun of about 85%, and stored in a refrigerator for 10 days.

The product was examined at the end of the 10-day period and was found to have retained its initial volume, and could be readily poured from its container. No separation was observed in the emulsion which was uniform and homogeneous.

EXAMPLE 2

A chocolate dairy shake was prepared from the following ingredients:

| Ingredient | Amount (%) |
| --- | --- |
| 1. Nonfat dry milk | 6.00 |
| 2. Whey concentrate | 5.00 |
| 3. Isosweet 100 | 12.00 |
| 4. Sucrose | 9.00 |
| 5. 36 D.E. corn syrup | 3.00 |
| 6. Seakem C | .02 |
| 7. Avicel CL-611 | .45 |
| 8. CMC-7HOF | .10 |
| 9. Water | 54.57 |
| 10. D-23-A | 1.75 |
| 11. Ice II | .20 |
| 12. Butter | 7.41 (about 6% butter fat) |
| 13. Overtone Vanilla | .50 |

The procedure followed was the same as that for Example 1 except that ingredients (11) and (13) were added along with the butter to a solution of the other components. The product was whipped to about an 85% overrun.

EXAMPLE 3

Dextrose, dairy whey and whey protein containing premixes were prepared from the following ingredients:

| Ingredient | Dextrose Premix Amount (%) | Dairy Whey Premix Amount (%) | Whey Protein Concentrate Premix Amount (%) |
| --- | --- | --- | --- |
| 1. Seakem C | .67 | .67 | .67 |
| 2. Avicel CL-611 | 15.00 | 15.00 | 15.00 |
| 3. CMC 7HOF | 3.30 | 3.30 | 3.30 |
| 4. Ice II | 6.70 | 6.70 | 6.70 |
| 5. Dairy Whey | — | 55.00 | — |
| 6. Dextrose | 55.00 | — | — |
| 7. Whey Protein Concentrate | — | — | 55.00 |
| 8. Palm Kernel Oil | 19.33 | 19.33 | 19.33 |

A dextrose premix, dairy whey premix and whey protein concentrates premix were prepared by dry blending the ingredients (1)–(4) and either ingredients (5), (6) or (7). The palm kernel oil was then melted and poured over and mixed with the dry blended ingredients. Dairy whipped products were prepared by combining the premixes with the following ingredients:

| Ingredient | Amount (%) |
| --- | --- |
| 1. Sucrose | 9.00 |
| 2. Nonfat dry milk | 7.50 |
| 3. Whey concentrate | 3.35 |
| 4. Isosweet 100 | 12.00 |
| 5. D.E. corn syrup | 3.00 |
| 6. Premix | 3.00 |
| 7. Water | 54.24 |
| 8. Overtone (Vanilla) | .50 |
| 9. Butter | 7.41 (about 6% butter fat) |

The dairy whipped product was prepared by adding the Isosweet 100 (4) to water (7), followed by the addition of the corn syrup (5) and vanilla flavor (8), under high shear and while the mixture was heated to about 160° F. The premix (6) was then added, mixed with the other ingredients until dissolved. The sucrose (1) and components (2) and (3) were then added to the other ingredients and mixed at high shear and pasteurizing temperatures until dissolved. The butter (9) was then added, the mixture was heated to about 165° F. and was homogenized in two steps, first at about 500 psi, and then at 3,000 psi, until a substantially homogeneous emulsion was formed. The product was cooled in a heat exchanger until the product temperature was about 36° F. to about 46° F. The product was then whipped and stored in a suitable container at about 41° F. for 5 days. The product volume remained constant for the five-day period, and the emulsion was acceptably stable with only trace amounts of separation noted for the products prepared from the dairy whey and whey protein concentrate premixes.

EXAMPLE 4

Mellorine vanilla shake formulations were prepared from the ingredients set forth in Table I, in combination with ingredients (1)–(2) and (6)–(14) as set forth in Example I. The procedure of Example 1 was employed, except that the glycerol and 15 D.E. maltodextrin, 15 D.E. or 24 D.E. corn syrup solids were added to the water with the other sugars.

TABLE I

GLYCEROL-CONTAINING FORMULATIONS

| Ingredient | Amount (%) | | | | | |
|---|---|---|---|---|---|---|
| | A | B | C | D | E | F |
| High fructose corn syrup | 12.0 | 12.0 | 12.0 | 12.0 | 12.0 | 12.0 |
| Glycerol | 0.5 | 2.0 | 4.0 | 6.0 | 2.0 | 2.0 |
| 15 D.E. maltodextrin | 0.5 | 2.0 | 4.0 | 6.0 | — | — |
| 15 D.E. corn syrup solids | — | — | — | — | 2.0 | — |
| 24 D.E. corn syrup solids | — | — | — | — | — | 2.0 |
| Sucrose | 8.0 | 5.0 | 1.0 | — | 5.0 | 5.0 |
| 36 D.E. corn syrup | 3.0 | 3.0 | 3.0 | — | 3.0 | 3.0 |

At the end of a 10-day storage period at refrigerator temperatures, the products of Table I retain their initial whipped volumes, and are readily pourable. No separation is observed in the emulsions, which are uniform and homogeneous. The products exhibit a perceived sweetness less than that of the product of Example 1.

EXAMPLE 5

Mellorine vanilla shakes were prepared as outlined in Table II according to the procedure of Example 1 using 1:1 mixtures of pregelatinized starch (Durgel ®, A. E. Staley Co.) and Tapioca Dextrin to replace all of the Avicel and a part of the CMC, respectively.

TABLE II

| Ingredient | Amount (%) | |
|---|---|---|
| | A | B |
| Water | 54.51 | 53.27 |
| Isosweet 100 | 12.0 | 12.0 |
| 36 D.E. Corn Syrup | 3.0 | 3.0 |
| Overtone Vanilla | 0.5 | 0.5 |
| Glyco Aldo HMS | 0.47 | 0.47 |
| Non-Fat Dry Milk | 7.50 | 7.50 |
| Whey Protein Concentrate | 5.00 | 5.00 |
| Seakem C | — | 0.22 |
| Seakem D-10 | 0.1 | — |
| Avicel CL-611 | — | 0.2 |
| CMC 7HOF | 0.15 | 0.04 |
| Duragel | 2.0 | 1.0 |
| Dextrin | 2.0 | 1.0 |
| Sucrose | 9.0 | 9.0 |
| Coconut Oil | 3.75 | 3.75 |
| Soybean Oil | 2.25 | 2.25 |

Glyco Aldo HMS (Glyo, Inc., Greenwich, Ct.) is a purified mixture of glyceryl mono- and distearates. After whipping, the products of Ex. 5A and 5B were frozen by cooling them to −10° F. and then thawed at refrigerator temperatures of about 40° F. After four days of refrigerator storage the products exhibited a uniform, homogeneous emulsion with only traces of separation.

EXAMPLE 6

A portion of the products of each of Examples 1, 2, 3, and 4 was placed in a freezer and stored for 12 weeks at about 0° F. The products were periodically removed from the freezer and examined over the test period. The volume of each of the products remained unchanged from its initial volume. The products of Examples 1-3 were spoonable and noncrystalline upon removal from the freezer and reached the flowable state after about a 20-30 minute exposure to ambient temperatures. The products of Example 4 were also spoonable and non-crystalline at freezer temperatures, and reached the flowable state after about 5-10 minutes exposure to ambient temperatures.

This invention has been described in terms of specific embodiments set forth in detail, but it should be understood that these are by way of illustration and that the and variations will be apparent from the disclosure and may be resorted to without departing from the spirit of this invention, as those of skill in the art will readily understand. Accordingly, such variations and modifications are considered to be within the purview and scope of this invention and the following claims.

What is claimed is:

1. A whipped food product comprised of an oil-in-water emulsion of nonfat milk solids, water, sugar in a ratio to water of about 1:1.75 to about 3.0, said sugar being comprised of at least about 30% fructose and/or dextrose; fat, wherein said fat includes a solid beta phase-tending crystalline fat, and minor, effective amounts of flavoring, emulsifier, and stabilizer, wherein the stabilizer comprises a polysaccharide stabilizer effective to substantially inhibit the crystallization of the lactose present in the nonfat milk solids, wherein the product is substantially noncrystalline and spoonable at about 0° F., and the volume of the product remains substantially constant during storage at about 0° F. for at least about six months.

2. The whipped food product according to claim 1 wherein the stabilizer comprises sodium carboxymethylcellulose and carrageenan.

3. The whipped food product according to claim 2 further comprising microcrystalline cellulose.

4. The whipped food product according to claim 2 wherein the polysaccharide stabilizer comprises about a 1:1 mixture of dextrin and pregelatinized starch.

5. The whipped food product according to claim 1 comprised of about 2% to about 7% of beta phase-tending crystalline fat, about 0.025% to about 0.28% sodium carboxymethylcellulose, about 0.01-1.0% carrageenan, a protein solids content in the product of about 3% to about 10%, and the volume of the product remains substantially constant during storage at about 0° F. for at least about one year.

6. The whipped food product of claim 5 further comprising whey.

7. The whipped food product according to claim 6 further comprising about 0.125% to about 1% microcrystalline cellulose.

8. The whipped food product according to claim 5 further comprising about 0.5-5% of dextrin and about 0.5-5% pregelatinized starch in an about 1:1 weight ratio.

9. The whipped food product according to claim 5 wherein the sugar is comprised of sucrose, corn syrup and a fructose-dextrose syrup.

10. The whipped food product according to claim 5 wherein said beta phase-tending crystalline fat is butter fat, and the product is a dairy milk shake, which can be consumed through a straw when the shake is at a temperature of about 42° F., and wherein the volume of the product remains substantially constant during storage at refrigerator temperatures of about 42° F. for at least about 5 days.

11. The whipped food product according to claim 5 wherein said fat includes an unsaturated vegetable oil, the product is a part-dairy milk shake which can be consumed through a straw when the shake is at a temperature of about 42° F., and wherein the volume of the product remains substantially constant during storage at refrigerator temperatures of about 42° F. for at least about 5 days.

12. A whipped ice cream or milk shake product comprised of about 5% to about 8% nonfat milk solids, about 3% to about 6% whey concentrate, about 54% to about 62% water, and sugar in a ratio to water of about 1:1.75 to about 3.0, wherein said sugar component is comprised of at least about 30% fructose and/or dextrose; and minor, effective amounts of flavoring, emulsifier, and stabilizers comprised of about 0.125–10% of polysaccharides comprising sodium carboxymethylcellulose and carrageenan, and about 3% to about 7% fat wherein at least about 50% of said fat is a solid beta phase-tending crystalline fat, and wherein the product is spoonable and substantially noncrystalline at about 0° F., and the volume of the product remains substantially constant during storage at about 0° F. for at least about six months.

13. The whipped product according to claim 12 wherein the polysaccharide stabilizers further comprise about a 1:1 mixture of dextrin and pregelatinized starch.

14. The whipped product according to claim 12 wherein the polysaccharide stabilizers further comprise microcrystalline cellulose.

15. The whipped product according to claim 12 comprising a part-dairy shake wherein said fat includes an unsaturated vegetable oil, and the product comprises about 10% to about 13% of a fructose-dextrose syrup comprised of about 30% to about 90% fructose, about 7% to about 10% of sucrose, and about 1.5% to about 4% of about a 27 to about 75 D.E. corn syrup, about 0.05% to about 0.2% of sodium carboxymethylcellulose, and about 0.01–1% calcium carrageenan, wherein the volume of the product remains substantially constant for at least about 10 days at refrigerator temperatures of about 42° F. and for at least about one year at freezer temperatures of about 0° F.

16. The whipped product according to claim 15 which further comprises about 0.125–1% microcrystalline cellulose.

17. The whipped product according to claim 12 wherein said beta phase-tending crystalline fat is butter fat, the product is a dairy shake, and comprises about 10% to about 13% of a fructose-dextrose syrup comprised of about 30% to about 90% fructose, about 7% to about 10% sucrose, about 1.5% to about 4% of about a 27 to about 75 D.E. corn syrup, about 0.05% to about 0.2% of sodium carboxymethylcellulose, and about 0.35% to about 0.50% of microcrystalline cellulose, and tie product further comprises calcium carrageenan or sodium alginate, wherein the volume of the product remains substantially constant for at least about 10 days at refrigerator temperatures of about 42° F. and for at least about one year at freezer temperatures of about 0° F.

18. A whippable food product comprised of an oil-in-water emulsion of nonfat milk solids, and about 40% to about 70% water, and sugar in a ratio to water of about 1:1.75 to about 3.0, said sugar being comprised of at least about 30% fructose and/or dextrose; and about 3% to about 10% fat, wherein at least about 50% of said fat is a solid beta phase-tending crystalline fat, and minor, effective amounts of flavoring, emulsifier, and stabilizers comprised of microcrystalline cellulose and sodium carboxymethylcellulose, and when whipped the product is substantially noncrystalline and spoonable at about 0° F., and the volume of the product when whipped remains substantially constant during storage at about 0° F. for at least about six months.

19. The method according to claim 18 which comprises making a milk shake product wherein said mixture includes calcium carrageenan, about 3% to about 7% beta phase-tending crystalline fat, about 0.125% to about 1% microcrystalline cellulose, about 0.025% to about 0.28% sodium carboxymethylcellulose, and about 3% to about 10% protein solids wherein the volume of the product remains substantially constant during storage at about 0° F. for at least about one year, and at about 42° F. for at least about 10 days.

20. The whippable food product according to claim 19 wherein the stabilizers further comprise an about 1:1 mixture of dextrin and pregelatinized starch.

21. The whippable food product according to claim 19 wherein said fat is comprised of a solid beta phase-tending crystalline fat and an unsaturated vegetable oil, and said product comprises about 10% to about 13% of a fructose-dextrose syrup comprised of about 30% to about 90% fructose, about 7% to about 10% of sucrose, and about 1.5% to about 4% of about a 27 to about 75 D.E. corn syrup, and when whipped the volume of the product remains substantially constant for at least about 10 days at refrigerator temperatures of about 42° F.

22. The whippable food product according to claim 21 further comprising an about 1:1 mixture of about 0.5–5% each of dextrin and pregelatinized starch.

23. The whippable food product according to claim 19 wherein said fat comprises butter fat and said product comprises about 10% to about 13% of a fructose-dextrose corn syrup comprised of about 40% to about 90% fructose, about 7% to about 10% sucrose, and about 1.5% to about 4% of about a 27 to about 75 D.E. corn syrup, and when whipped the volume of the product remains substantially constant for at least about 10 days at refrigerator temperatures of about 42° F.

24. A premix for use in the preparation of whipped food products comprising about 1.5% to about 20% of an emulsifier, about 5% to about 35% of a stabilizer comprised of sodium carboxymethylcellulose and carrageenan, about 10% to about 30% of a solid beta crystalline fat, and a dairy-based carrier for the foregoing ingredients.

25. The premix according to claim 24 comprising about 1% to about 6% sodium carboxymethylcellulose, about 0.125% to 2.0% of calcium carrageenan and about 20–80% carrier.

26. The premix according to claim 25 further comprising about 1–25% of microcrystalline cellulose.

27. The premix according to claim 25 further comprising an about 1:1 ratio of about 5–20% dextrin and about 5–20% pregelatinized starch.

28. A method for preparing a whipped milk shake or ice cream product comprising:
  a. mixing together about 1.5% to about 20% of an emulsifier, about 5% to about 35% of a stabilizer comprised of sodium carboxymethylcellulose and carrageenan, and about 20% to about 80% of a dairy-based protein carrier comprising whey, and about 10% to about 80% by weight of a solid beta phase-tending crystalline fat, and then b. blending the mixture with nonfat milk solids, sugar, water, flavoring and protein solids, and c. cooling and whipping the resultant blend to provide a milk shake or ice cream product.

29. The method according to claim 28 wherein the milk shake or ice cream product is prepared by forming an emulsion by blending a mixture comprised of about 3% to about 4% of the product of step (a) of claim 28 with nonfat milk solids, about 40% to about 70% water, sugar in a ratio to water of about 1:1.75 to about 3.0, said sugar being comprised of at least about 30% fructose and/or dextrose; and additional fat sufficient to bring the fat content of the mixture to about 3% to about 10%, wherein at least about 50% of the fat content of the product is a solid beta phase-tending crystalline fat, and then cooling and whipping the emulsion to provide a milk shake or ice cream product which is substantially noncrystalline and spoonable at about 0° F. and which remains substantially constant in volume during storage at about 0° F. for about six months.

30. The method according to claim 28 wherein a milk shake product is prepared by forming an emulsion by blending together a mixture of about 3% to about 6% whey, about 54% to about 62% water and sugar in a ratio to water of about 1:1.75 to about 3.0, wherein the sugar is comprised of at least about 30% fructose and/or dextrose, flavoring and about 5% to about 8% nonfat milk solids, about 3% to about 10% of a fat wherein at least about 50% of said fat is a solid beta phase-tending crystalline fat, and about 3% to about 4% of the product of step (a) of claim 28, and then cooling and whipping the emulsion to provide a milk shake or ice cream product which is spoonable and substantially noncrystalline at freezer temperatures of about 0° F., and which remains substantially constant in volume during storage at about 0° F. for at least about one year.

31. A method for preparing a whipped food product comprising:

a. mixing together nonfat milk solids, about 40% to about 70% water, and sugar in a ratio to water of about 1:1.75 to about 3.0, said sugar being comprised of at least about 30% fructose and/or dextrose; and about 3% to about 10% fat, wherein said fat is comprised of at least about 50% of a beta phase-tending crystalline fat, and minor, effective amounts of flavoring, emulsifier and stabilizers comprised of microcrystalline cellulose, carboxymethylcellulose and carrageenan, and b. pasteurizing, homogenizing, and cooling the mixture, and then whipping the homogenized, pasteurized and cooled mixture to provide an ice cream or milk shake product which is substantially noncrystalline and spoonable at freezer temperatures of about 0° F., and which remains substantially constant in volume during storage at freezer temperatures of about 0° F. for at least about six months.

32. The method according to claim 31 which comprises making a milk shake product wherein said mixture includes calcium carrageenan, about 3% to about 7% beta phase-tending crystalline fat, about 0.125% to about 1% microcrystalline cellulose, about 0.025% to about 28% sodium carboxymethylcellulose, and about 3% to about 10% protein solids, wherein the volume of the product remains substantially constant during storage at about 0° F. for at least about one year, and at about 42° F. for at least about 10 days.

33. A whipped food product comprised of an oil-in-water emulsion of nonfat milk solids, about 40% to about 70% water, sugar, and about 0.25–10% of an edible polyhydric alcohol wherein the ratio of sugar plus polyhydric alcohol to water is about 1:1.75 to about 3.0, said sugar being comprised of at least about 30% fructose and/or dextrose; and about 3% to about 10% fat, wherein at least about 50% of said fat is a solid beta phase-tending crystalline fat, and minor, effective amounts of flavoring and emulsifier, and an amount of stabilizer comprised of a polysaccharide stabilizer effective to substantially inhibit the crystallization of the lactose present in the nonfat milk solids, wherein the product is substantially noncrystalline and spoonable at about 0° F., and the volume of the product remains substantially constant during storage at about 0° F. for at least about six months.

34. The whipped product according to claim 33 comprised of about 0.5–6% maltodextrin, about 2% to about 7% of beta phase-tending crystalline fat, about 0.125% to about 1% microcrystalline cellulose, about 0.01–1% carrageenan, about 0.025% to about 0.28% sodium carboxymethylcellulose, about 3% to about 10% of protein solids, and the volume of the product remains substantially constant during storage at about 0° F. for at least about one year.

35. The whipped product according to claim 33 wherein the polyhydric alcohol comprises glycerol in an amount equal to at least 40% of the total sugar solids.

36. The whipped food product according to claim 34 comprising about 3–10% lactose wherein said lactose and said protein solids in said product are provided by nonfat milk solids, dairy whey, whey protein concentrate, or mixtures thereof and wherein the polyhydric alcohol comprises glycerol.

37. The whipped food product according to claim 36 comprising about 5–8% nonfat milk solids and about 3–6% whey.

38. The whipped food product according to claim 37 wherein the sugar is comprised of sucrose, corn syrup and a fructose-dextrose syrup.

39. The whipped food product according to claim 38 wherein the fructose-dextrose syrup comprises about 40% to about 90% fructose.

40. The whipped food product according to claim 39 wherein the fructose-dextrose syrup comprises about 29% water and about 71% of a sugar comprised of about 42% fructose and about 50% dextrose.

41. The whipped food product according to claim 35 further comprising about 0.25–10% corn syrup solids.

42. The whipped food product according to claim 35 wherein said beta phase-tending crystalline fat is butter fat, and the product is a dairy milk shake, which becomes pourable within about 5–10 minutes after removal from freezer storage at about 0° F. and exposure to ambient temperature.

43. The whipped food product according to claim 35 wherein said fat includes an unsaturated vegetable oil, and the product is a part-dairy milk shake which becomes pourable within 5–10 minutes after removal from freezer storage at about 0° F. and exposure to ambient temperatures.

44. A whipped ice cream or milk shake product comprised of about 15–25% dairy-based carriers, about 0.5–6.0% glycerol, about 54% to about 62% water, and sugar plus glycerol in a ratio to water of about 1:1.75 to about 3.0, wherein said sugar component is comprised of at least about 30% fructose and/or dextrose; and minor effective amounts of flavoring, emulsifier, and an amount of polysaccharide stabilizers comprised of microcrystalline cellulose, carrageenan and sodium carboxymethylcellulose effective to substantially inhibit the crystallization of the lactose present in said carriers, and about 3% to about 7% fat wherein at least about 50% of said fat is a solid beta phase-tending crystalline fat, and wherein the product is spoonable and substantially noncrystalline at about 0° F., and the volume of the product remains substantially constant during storage at about 0° F. for at least about six months.

45. The whipped product according to claim 44 comprising a part-dairy shake wherein said fat includes an unsaturated vegetable oil, and the product comprises about 10% to about 13% of a fructose-dextrose syrup comprised of about 30% to about 90% fructose, about 7% to about 10% of sucrose, about 0.5–6.0% maltodextrin, and about 1.5% to about 4% to about a 27 to about 75 D.E. corn syrup, about 0.025% to about 0.28% of sodium carboxymethylcellulose, about 0.125% to about 1.0% of microcrystalline cellulose, and about 0.01–1% calcium carrageenan, wherein the volume of the product remains substantially constant for at least about 10 days at refrigerator temperatures of about 42° F. and for at least about one year at freezer temperatures of about 0° F.

46. The whipped product according to claim 44 wherein the sugar further comprises about 0.5–6.0% of corn syrup solids.

47. The whipped product according to claim 45 wherein the flavoring is strawberry, cocoa or vanilla, and the product can be consumed through a straw when it is at a temperature of about 42° F.

48. The whipped product according to claim 44 wherein said fat is comprised of about equal parts of soybean oil and coconut oil, and said carriers comprise a mixture of nonfat milk solids and whey.

49. A whippable food product comprised of an oil-in-water emulsion of nonfat milk solids, an edible polyhydric alcohol, and about 40% to about 70% water, and sugar plus polyhydric alcohol in a ratio to water of about 1:1.75 to about 3.0, said sugar being comprised of at least about 30% fructose and/or dextrose; and said polyhydric alcohol plus said fructose and/or dextrose being about 45–85% by weight of the total sugar, and about 3% to about 10% fat, wherein at least about 50% of said fat is a solid beta phase-tending crystalline fat, and minor, effective amounts of flavoring, emulsifier, and about 0.25–5% of polysaccharide stabilizers comprised of carrageenan and sodium carboxymethylcellulose, and when whipped the product is substantially noncrystalline and spoonable at about 0° F., and the volume of the product when whipped remains substantially constant during storage at about 0° F. for at least about six months.

50. A whippable food product comprised of about 5% to about 8% nonfat milk solids, about 0.5–6.0% glycerol, about 3% to about 6% whey, about 54% to about 62% water, and sugar plus glycerol in a ratio to water of about 1:1.75 to about 3.0, wherein said sugar component is comprised of at least about 30% fructose and/or dextrose; and minor, effective amounts of flavoring, emulsifier, and polysaccharide stabilizers comprised of microcrystalline cellulose, sodium carboxymethylcellulose and calcium carrageenan in a total amount effective to substantially inhibit the crystallization of the lactose present in the whey and in the milk solids; and about 4% to about 7% fat wherein said fat includes at least about 50% of a solid beta phase-tending crystalline fat and when the product is whipped, it is spoonable and noncrystalline at about 0° F., and the volume of the product when whipped remains substantially constant during storage at about 0° F. for at least about one year.

51. The whippable food product according to claim 50 wherein the flavoring is cocoa, strawberry or vanilla.

52. The whippable food product according to claim 50 wherein the sugar comprises 0.5–6.0% solids selected from the group consisting 15 D.E. corn syrup solids or 24 D.E. corn syrup solids.

53. The whippable food product according to claim 50 wherein said fat is comprised of about equal parts of soybean oil and coconut oil.

54. A method for preparing a whipped food product comprising:
 a. mixing together nonfat milk solids, whey, about 40% to about 70% water, and an edible polyhydric alcohol, wherein the ratio of sugar plus alcohol to water is about 1:1.75 to about 3.0, said sugar being comprised of at least about 30% fructose and/or dextrose; and about 3% to about 10% fat, wherein said fat is comprised of at least about 50% of a beta phase-tending crystalline fat, and minor, effective amounts of flavoring, emulsifier and about 0.125–10% of stabilizers comprised of carrageenan, microcrystalline cellulose and sodium carboxymethylcellulose, and
 b. pasteurizing, homogenizing, and cooling the mixture, and then whipping the homogenized, pasteurized and cooled mixture to provide an ice cream or milk shake product which is substantially noncrystalline and spoonable at freezer temperatures of about 0° F., and which remains substantially constant in volume during storage at freezer temperatures of about 0° F. for at least about six months.

55. The method of claim 54 wherein the polyhydric alcohol comprises about 0.25–10% glycerol and the sugar component comprises about an equal amount of 15 D.E. corn syrup solids or 24 D.E. corn syrup solids.

56. The method accoding to claim 54 which comprises making a milk shake product wherein said mixture includes about 0.01–1% calcium carrageenan, about 3% to about 7% beta phase-tending crystalline fat, about 0.5–6.0% maltodextrin, about 0.5–6.0% glycerol, about 0.025% to about 0.28% sodium carboxymethylcellulose, about 3% to about 10% protein solids and about 3–10% lactose, wherein the volume of the product remains substantially constant during the storage at about 0° F. for at least one year, and wherein the product becomes flowable in about 5–10 minutes after removal from 0° F. storage and exposure to ambient temperatures.

57. The method according to claim 56 which comprises making a dairy milk shake wherein said beta phase-tending crystalline fat comprises butter fat.

58. The method according to claim 56 which comprises making a part-dairy shake, wherein said beta phase-tending crystalline fat comprises about equal parts of a beta phase-tending crystalline fat and a polyunsaturated vegetable oil.

* * * * *

UNITED STATES PATENT AND TRADEMARK OFFICE
CERTIFICATE OF CORRECTION

PATENT NO. : 4,552,773
DATED : November 12, 1985
INVENTOR(S) : Marvin L. Kahn and Robert J. Lynch It is certified that error appears in the above-identified patent and that said Letters Patent is hereby corrected as shown below:

Column 2, line 42, change "20% off an" to --20% of an--.

Column 4, line 9, change "foam, sub-" to --foam and sub- --.

Column 4, line 15, change "herein after" to --hereinafter--.

Column 5, line 61, change "herein in" to --herein is--.

Column 6, line 67, change "slow" to --sole--.

Column 8, line 18, change "shipping the" to --shipping, the--.

Column 10, line 19, change "concentrates" to --concentrate--.

Column 12, line 9, change "that the" to --that the modifications--

Column 13, line 56, change "tie" to --the--.

Column 18, line 12, change "consisting 15" to
                    --consisting of 15--.

Column 18, line 13, change "or 24" to --or of 24--.

Signed and Sealed this

Fifteenth Day of July 1986

[SEAL]

Attest:

DONALD J. QUIGG

Attesting Officer    Commissioner of Patents and Trademarks